(12) United States Patent
Stucky et al.

(10) Patent No.: US 9,196,425 B2
(45) Date of Patent: Nov. 24, 2015

(54) HIGH ENERGY CAPACITORS BOOSTED BY BOTH CATHOLYTE AND ANOLYTE

(71) Applicant: The Regents of the University of California, Oakland, CA (US)

(72) Inventors: Galen D. Stucky, Santa Barbara, CA (US); Xiulei Ji, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 238 days.

(21) Appl. No.: 14/102,164

(22) Filed: Dec. 10, 2013

(65) Prior Publication Data

US 2015/0062777 A1 Mar. 5, 2015

Related U.S. Application Data

(60) Provisional application No. 61/873,459, filed on Sep. 4, 2013.

(51) Int. Cl.
| | |
|---|---|
| *H01G 11/02* | (2013.01) |
| *H01G 11/36* | (2013.01) |
| *H01G 11/46* | (2013.01) |
| *H01G 11/62* | (2013.01) |
| *H01G 11/48* | (2013.01) |
| *H01G 11/64* | (2013.01) |

(52) U.S. Cl.
CPC ............. *H01G 11/36* (2013.01); *H01G 11/02* (2013.01); *H01G 11/62* (2013.01); *H01G 11/46* (2013.01); *H01G 11/48* (2013.01); *H01G 11/64* (2013.01)

(58) Field of Classification Search
CPC ........ H01G 11/02; H01G 11/36; H01G 11/46
USPC ........................................................ 361/502
See application file for complete search history.

(56) References Cited

U.S. PATENT DOCUMENTS

| | | | |
|---|---|---|---|
| 8,518,572 B2* | 8/2013 | Kim | H01M 4/8896 29/623.5 |
| 2011/0287316 A1* | 11/2011 | Lu | B82Y 30/00 429/215 |

OTHER PUBLICATIONS

A Hybrid Redox-Supercapacitor System with Anionic Catholyte and Cationic Anolyte, Wang et al., Journal of the Electrochemical Society, vol. 161, Issue 6, Published May 9, 2014.*
Improved Performance of Electric Double Layer Capacitor Using Redox Additive (VO2+/VO2+) aqueous electrolyte, Senthilkumar et al., Journal of Materials Chemistry A, vol. 1, Published May 29, 2013.*

(Continued)

*Primary Examiner* — Jeremy C Norris
*Assistant Examiner* — Nathan Milakovich
(74) *Attorney, Agent, or Firm* — Lumen Patent Firm

(57) ABSTRACT

An electrical double layer capacitor (EDLC) energy storage device is provided that includes an electrolyte having an anionic catholyte and a cationic anolyte, a positively charged electrode, and a negative charged electrode, where negatively charged oxidized species in the anionic catholyte are electrostatically attracted to the positively charged electrode, where positively charged reduced species in the cationic anolyte are electrostatically attracted to the negatively charged electrode, where self-discharge of the EDLC energy storage device is prevented.

17 Claims, 9 Drawing Sheets

(56) References Cited

OTHER PUBLICATIONS

Improving the Energy Density of Quasi-Solid-State electric double-layer capacitors by introducing redox additives into gel polymer electolytes, Fan et al., Journal of Materials Chemistry A, vol. 2, Published Apr. 23, 2014.*

Unusual energy enhancement in carbon-based electrochemical capacitors, Fic et al., Journal of Materials Chemistry, vol. 22, Published Sep. 28, 2012.*

* cited by examiner

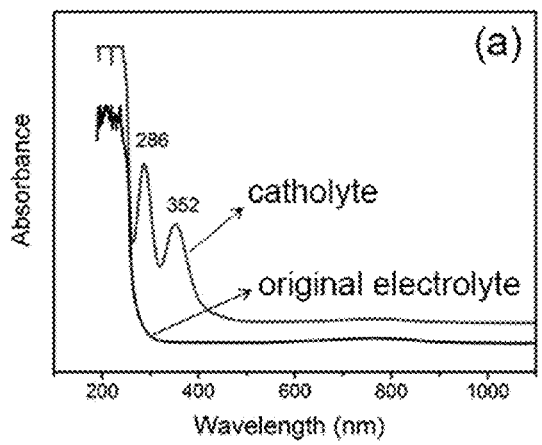
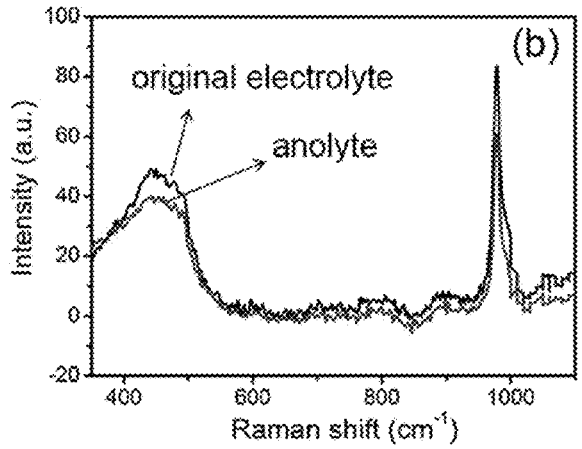
FIG. 6a   FIG. 6b
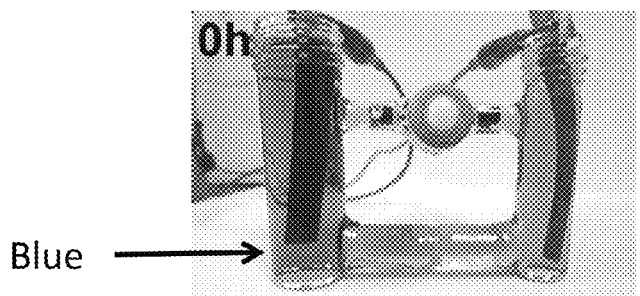
FIG. 7a
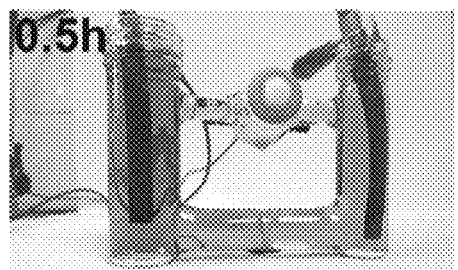
FIG. 7b
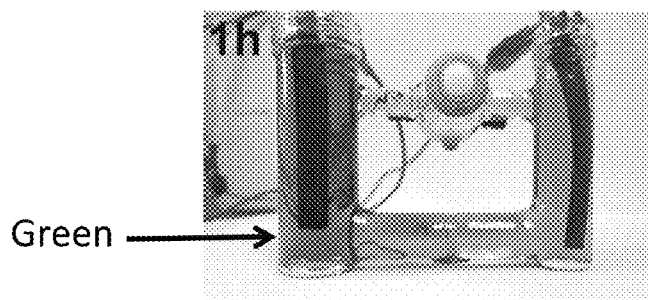
FIG. 7c

HIGH ENERGY CAPACITORS BOOSTED BY BOTH CATHOLYTE AND ANOLYTE

CROSS-REFERENCE TO RELATED APPLICATIONS

This application claims priority from U.S. Provisional Patent Application 61/873,459 filed Sep. 4, 2013, which is incorporated herein by reference.

STATEMENT OF GOVERNMENT SPONSORED SUPPORT

This invention was made with Government support under grant (or contract) no. DMR-0805148 awarded by the National Science Foundation. The Government has certain rights in this invention.

FIELD OF THE INVENTION

The present invention relates generally to energy storage devices. More particularly, the invention relates to a device that combines the high energy density of batteries with the high power density, rapid charging, and long cycle life of supercapacitors.

BACKGROUND OF THE INVENTION

Electrochemical devices deliver energy via spontaneous electron migration from one electrode to the other through an external circuit, driven either by Faradaic reactions, e.g. in batteries, or by polarization, e.g. in electrical double layer (EDL) capacitors (EDLCs). In a battery, solid-state Faradaic processes often lead to poor cycling reversibility and limited power performance. EDLCs, or supercapacitors, are based upon the EDL phenomenon at the interface between a polarized electrode and a liquid electrolyte. One EDLC is composed of two EDLs linked in series by an electrolyte bridge. Operation of EDLCs involves neither inter-electrode mass transfer nor solid-state ion diffusion, which leads to long cycling life and high-power. Significant progress has been made to EDLCs in terms of power densities and physical flexibility. Unfortunately, the low energy densities of EDLCs, typically <5 W·h/kg, seriously limit applications. To increase energy density, redox-active oxides, e.g. $RuO_2$ or $MnO_2$, have been added to electrodes to provide so-called "pseudo-capacitance" that is associated surface Faradaic redox chemistry. These devices exhibit compromised power performance and cycle lifetime, compared to EDLCs. Recently, incorporating solvated redox-active species into electrolytes has been reported to improve charge storage. One advantage of using soluble redox species is that the charge/discharge processes do not involve solid-state reactions or solid-state diffusion. A capacitor using KI and $VOSO_4$ solutions separated by a Nafion membrane into two compartments of a cell, as catholyte and anolyte, respectively has been reported. Enhanced energy density was observed. Nevertheless, the expensive Nafion membrane limits the practical application of this design. The use of the ion-selective separator reflects the challenge of controlling the self-discharge reaction between catholyte and anolyte.

What is needed is an energy storage device capable of battery-level energy density, capacitor-level durability and power density in one device.

SUMMARY OF THE INVENTION

To address the needs in the art, the invention provides an electrical double layer capacitor (EDLC) energy storage device that includes an electrolyte having an anionic catholyte and a cationic anolyte, a positively charged electrode, and a negative charged electrode, where negatively charged oxidized species in the anionic catholyte are electrostatically attracted to the positively charged electrode, where positively charged reduced species in the cationic anolyte are electrostatically attracted to the negatively charged electrode, where self-discharge of the EDLC energy storage device is prevented.

According to one aspect of the invention, the positively charged electrode includes a positively charged porous carbon electrode.

In a further aspect of the invention i) the negatively charged electrode is polarized, ii) the positively charged electrode is polarized, or iii) the negatively charged electrode is polarized and the positively charged electrode is polarized.

In yet another aspect of the invention, the anionic catholyte and the cationic anolyte include redox-reactive solvated ions.

According to one aspect of the invention, the anionic catholyte is oxidized when the EDLC energy storage device is in a charged condition, where the oxidized anionic catholyte remains proximal to the positive electrode.

In another aspect of the invention, the cationic anolyte is reduced when the EDLC energy storage device is in a charged condition, where the reduced cationic anolyte remains proximal to the negative electrode.

In a further aspect of the invention, the positive electrode and the negative electrode can include materials such as activated carbons, carbon nanotubes, mesoporous carbons, graphenes, metal oxides, or conducting polymers.

According to one aspect of the invention, the anionic catholyte includes materials such as halide ions, metal complex ions, or organic ion redox couples. In one aspect, the halide ions can include $I_3^-$, $I^-$, $Br_3^-$, or $Br^-$. In another aspect, the metal complex ions can include halide atoms, oxygen atoms or hydroxyl groups.

In a further aspect of the invention, the cationic anolyte can include material such as metal ions, metal complex ions, or organic ions. In one aspect, the metal ions comprise material can include $Ti^{2+}$, $Ti^{4+}$, $V^{2+}$, $V^{3+}$, $VO^{2+}$, $VO_2^+$, $Cr^{3+}$, $Cr^{2+}$, $Mn^{2+}$, $Fe^{3+}$, $Fe^{2+}$, $Cu^{2+}$, or $Cu^+$. In one aspect, the complex ions comprise material can include metal atoms, halide atoms, oxygen atoms or hydroxyl groups.

According to one aspect of the invention, the electrolyte includes non redox-active.

In yet another aspect of the invention, the electrolyte includes an aqueous solution.

In a further aspect of the invention, the electrolyte includes a non-aqueous solution that can include acetonitrile, or propylene carbonate.

According to another aspect of the invention, the electrolyte includes molten salts.

Galvanostatic discharge profiles of the I) [KI (0.15 M)+VOSO$_4$ (0.1 M)], II) [KI (0.3 M)+VOSO$_4$ (0.2 M)], III) [KI (0.75 M)+VOSO$_4$ (0.5 M)] cells at the current rate of 1 A/g; 3d) Discharge profiles of the [KI (0.3 M)+VOSO$_4$ (0.2 M)] cell at different discharge rates, from right to left: 1, 2, 4, and 8 A/g, respectively; 3e) Galvanostatic cycling profiles of the [KI (0.3 M)+VOSO$_4$ (0.2 M)] cell at 4 A/g, according to embodiments of the invention.

Figure 4:
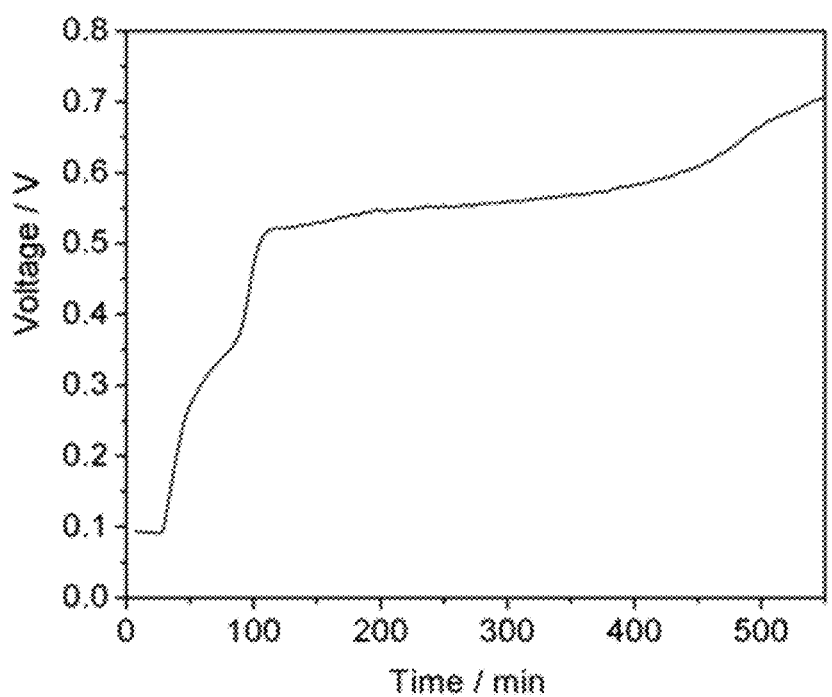

FIG. 4 shows galvanostatic charge profile of the [VOSO$_4$ (2 M), KI (3 M)] cell at 1 Ag$^{-1}$, according to one embodiment of the invention.

Figure 5:
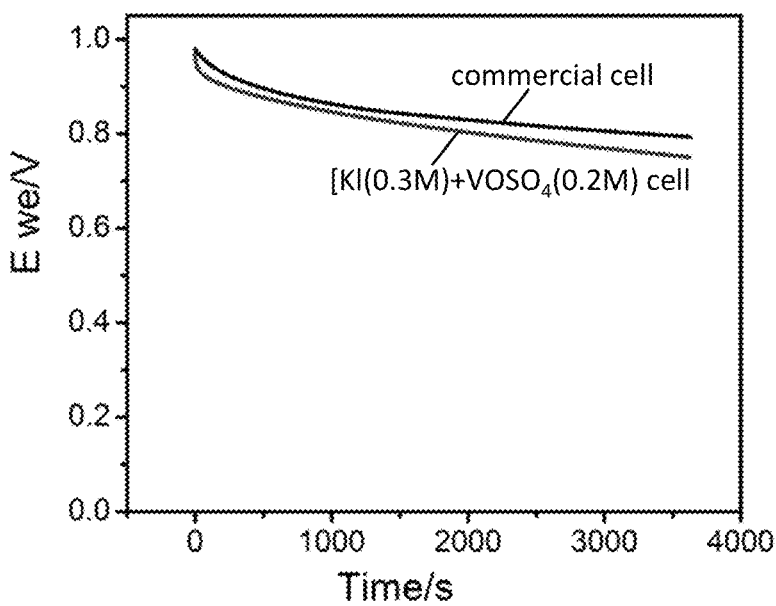

FIG. 5 shows open circuit voltage of the [KI (0.3 M)+VOSO$_4$ (0.2 M)] cell and a commercials cell from Cellergy (CLG03P012L12) using acidic aqueous solutions as the electrolytes, according to one embodiment of the invention.

FIGS. 6a-6b show 6a) UV-Vis spectra of the original electrolyte and catholyte (diluted 10:1 with water); 6b) Raman spectra of the original electrolyte and anolyte, according to one embodiment of the invention.

FIGS. 7a-7c show digital photos of the H-cell after different polarization durations, according to one embodiment of the invention.

Figure 8:
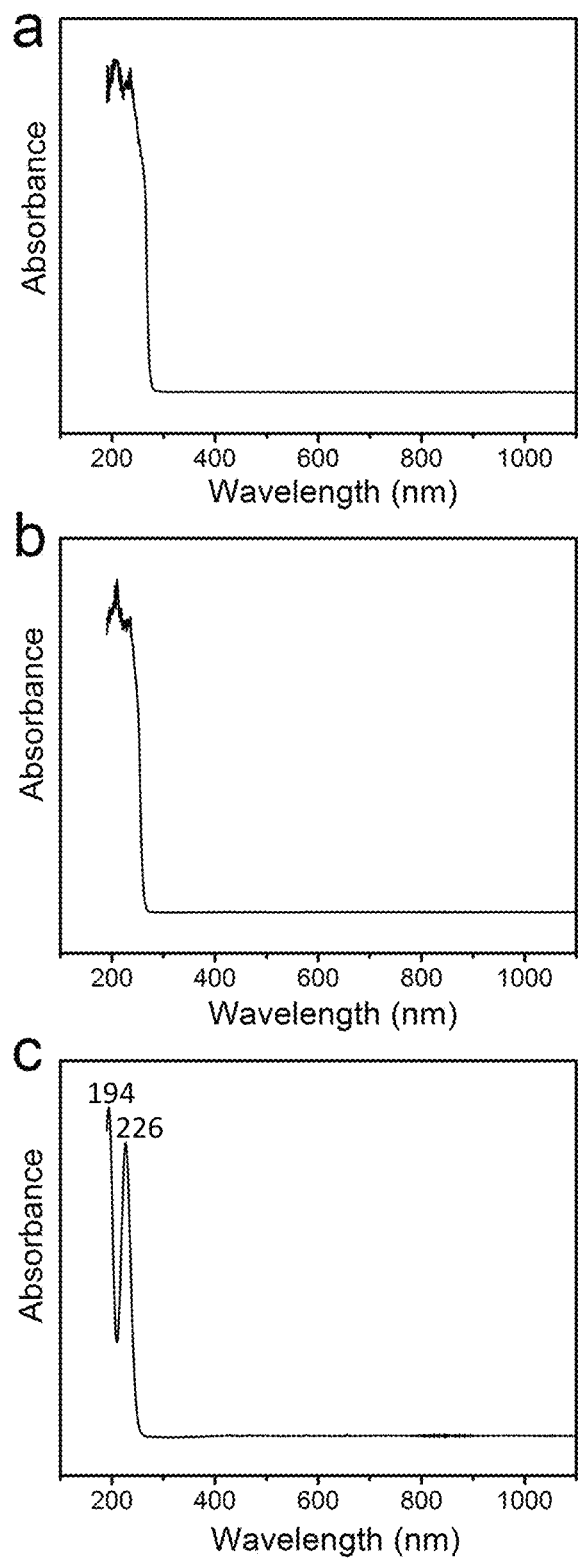

FIGS. 8a-8c show UV-Vis spectra of KI aqueous solution with initial concentration (0.3 M) store 1 h 8a), and diluted solutions with one-tenth 8b) and one percent 8c) of the initial concentration, according to embodiments of the invention.

Figure 9:
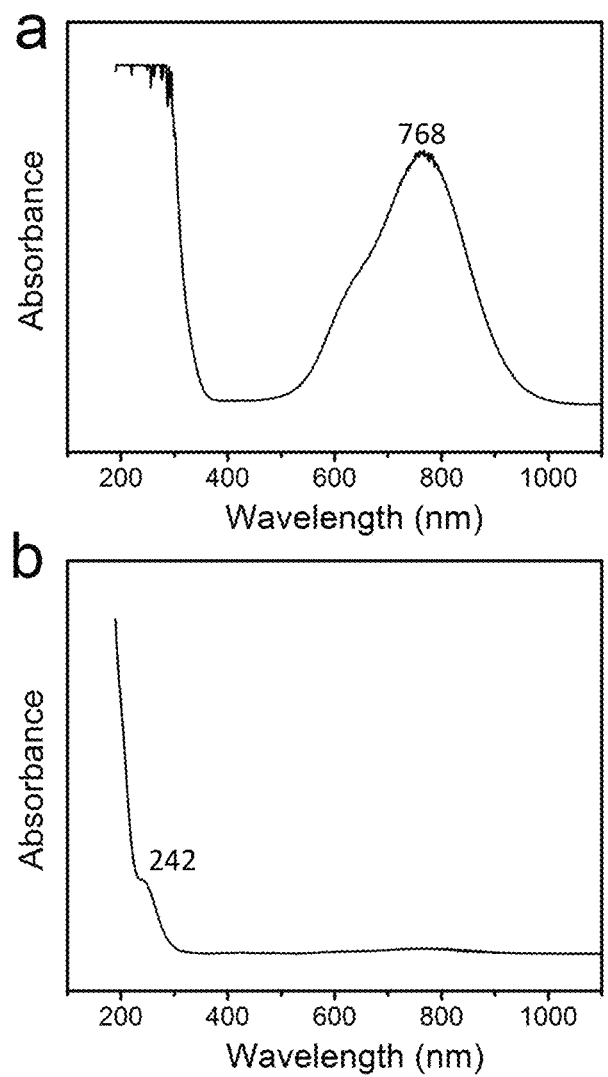

FIGS. 9a-9b show UV-Vis spectra of VOSO$_4$ aqueous solution with initial concentration (0.2 M) store 1 h 9a), and diluted solutions with one-tenth 9b) of the initial concentration, according to embodiments of the invention.

Figure 10:
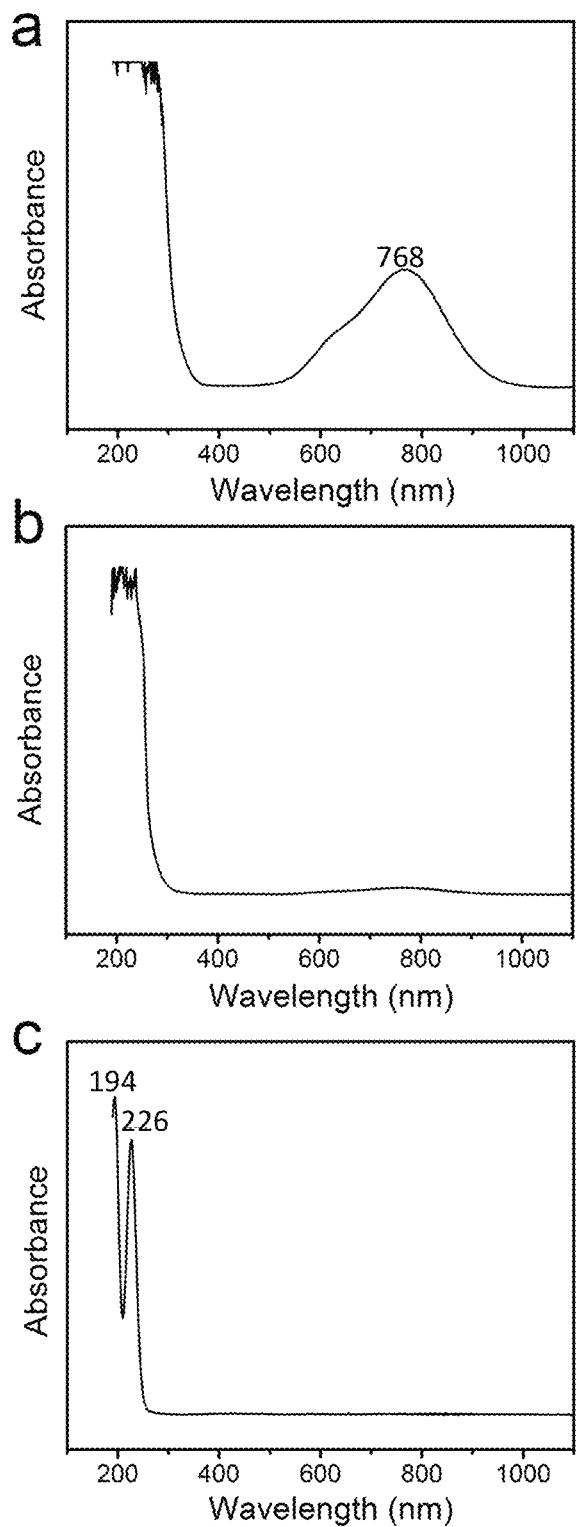

FIGS. 10a-10c show UV-Vis spectra of the original electrolyte (KI (0.3 M)+VOSO$_4$ (0.2 M)) store 1 h 10a), and diluted solutions with one-tenth 10b) and one percent 10c) of the initial concentration.

Figure 11:
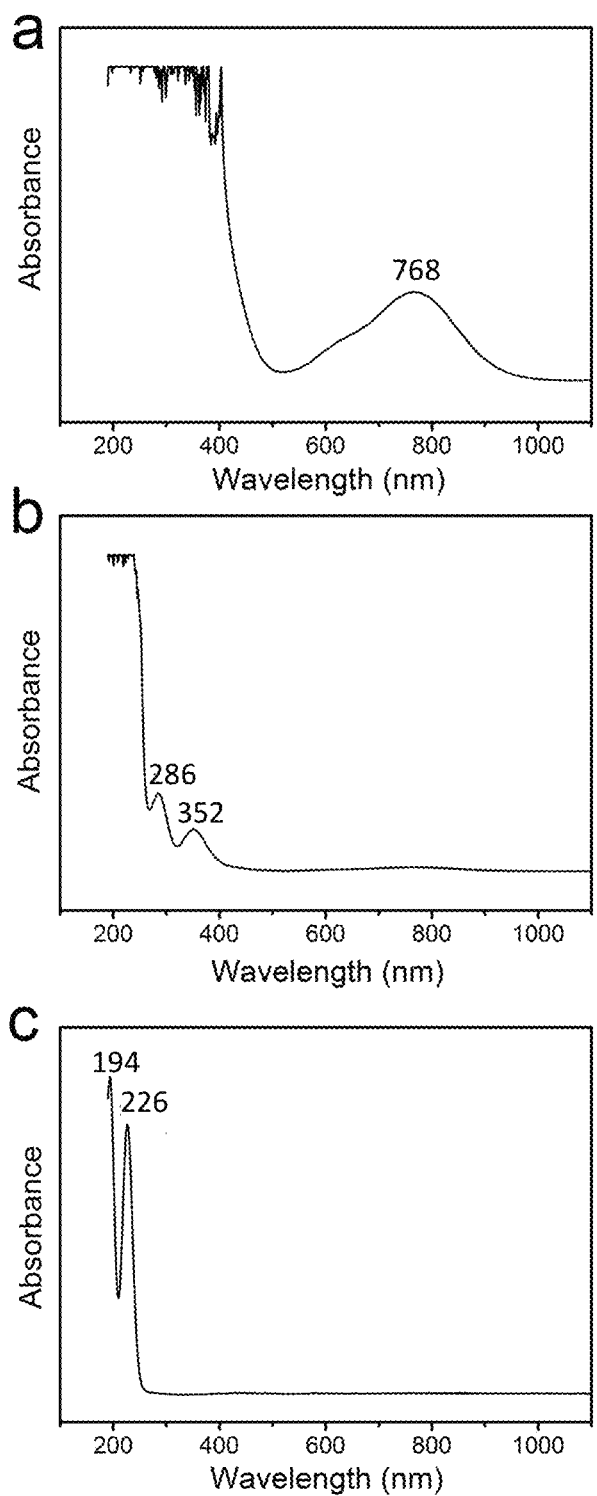
Figure 12:
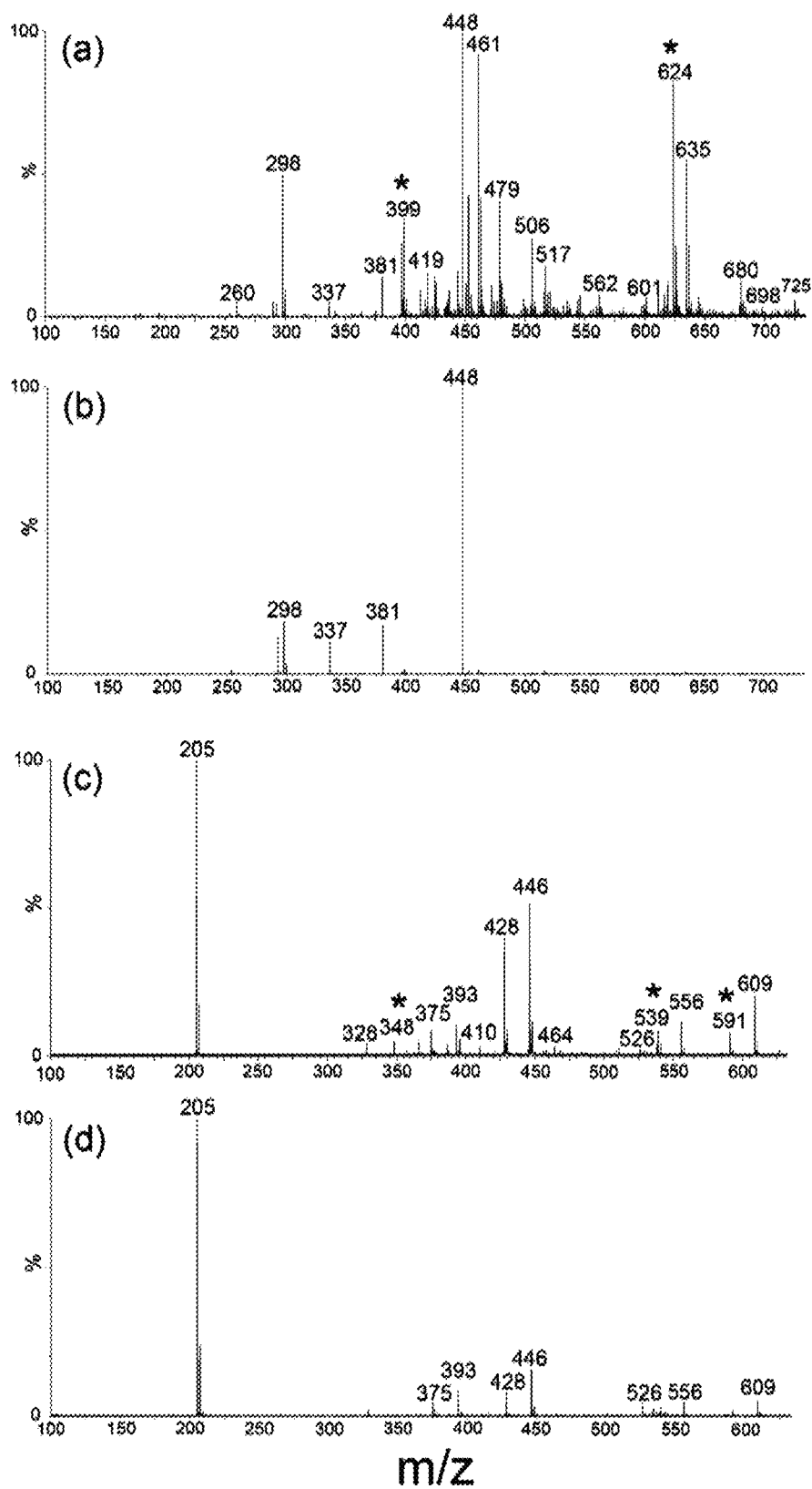

FIGS. 11a-11c show UV-Vis spectra of the anolyte after 1 h charging 11a), and diluted solutions with one-tenth 11b) and one percent 11c) of the initial concentration. Charging was carried out by polarizing the cell at 1 V for 1 hour before the measurements, according to embodiments of the invention.

FIGS. 12a-12d show mass spectra of anions in catholyte 12a) and the original electrolyte 12b); and cations in anolyte 12c) and the original electrolyte 12d). Charging was carried out by polarizing the cell at 1 V for 1 hour before the measurements, according to embodiments of the invention.

DETAILED DESCRIPTION

The current invention provides an electrolyte composed of an anionic catholyte and a cationic anolyte that significantly improves the energy density of electrical double layer capacitors (EDLCs). According to one embodiment, upon charging, the negatively charged oxidized species (containing $I_3^-$) in the catholyte are electrostatically attracted to the positively charged porous carbon electrode and the positively charged reduced species in the anolyte (containing $V^{3+}$) are electrostatically attracted to the negatively charged electrode, therefore preventing rapid self-discharge. The current invention retains key advantages of EDLCs while incorporating Faradaic energy-storage without using ion-selective membranes. In one embodiment, invention exhibits energy densities from 20 to 42 W·h/kg (based on the electrode mass) and stable capacities for >10$^4$ cycles. According to one example, ionic species formed in the electrolyte are studied by UV-Vis, Raman and mass spectroscopy to probe the energy storage mechanism. The invention provides a route to critically-needed fast-charging devices with both high energy density and power.

Figure 1:
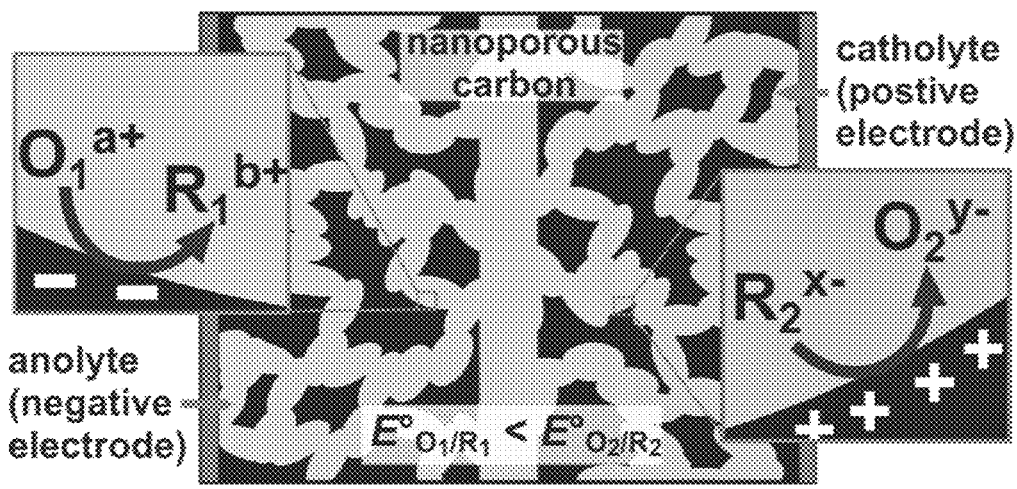
FIG. 1 Shows a schematic illustration of the capacitive and faradaic energy-storage processes occurring on the two electrodes, according to one embodiment of the invention.

In one exemplary embodiment, a mixed solution of KI and VOSO$_4$ is used as the electrolyte in EDLCs which integrate both Faradaic and capacitive energy storage in the same device. The polarized electrodes in the charged EDLCs retard diffusion of the oppositely-charged redox ions to mitigate self-discharge, and the cell does not need the ion-selective membrane as a separator for short-time-scale energy storage. During charging, the KI/VOSO$_4$ electrolyte evolves into both catholyte and anolyte, as schematically shown in FIG. 1. The device involves no solid-state phenomena during operation, no ion-selective membrane separator, and a single electrolyte. It is fundamentally different from previous devices, including pseudo-capacitors, batteries and Nafion-contained capacitors. Stable cycling life (10,000 cycles) and high energy density (20 to 42 W·h/kg) are demonstrated. The KI/VOSO$_4$ mixed electrolyte is characterized before and after the charging process to understand the energy storage mechanism.

Figure 2A:
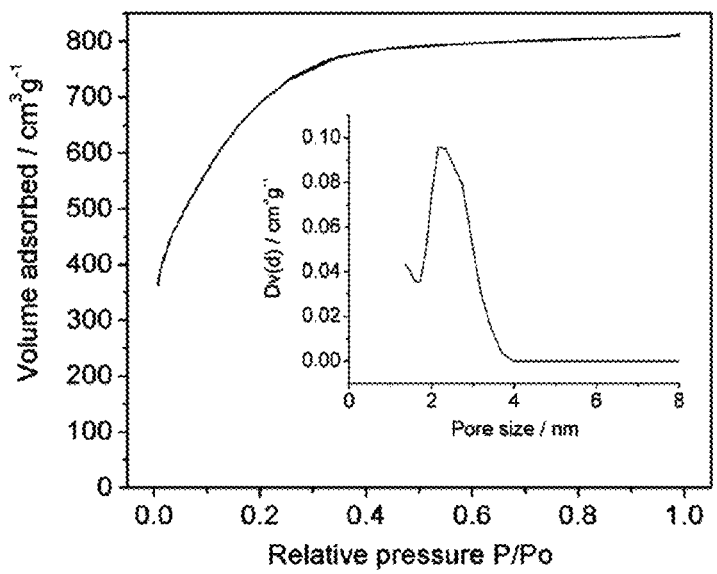
FIGS. 2a-2b show 2a) $N_2$ adsorption/desorption isotherm of activated carbon, inset: DFT pore size distribution, and 2b) A SEM image of the activated carbon, according to one embodiment of the invention.
Figure 2B:
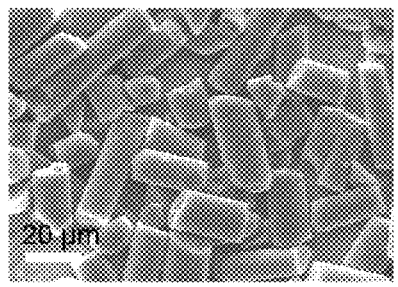

Aqueous electrolytes containing both KI and VOSO$_4$ of different concentrations with a molar ratio of 3:2 using two-electrode Swagelok® cells are presented. The cells only differ in the electrolyte used, and are referred to by their electrolyte salts and concentrations. Activated carbon fibers are used as the electrode material with a specific Brunauer-Emmet-Teller (BET) surface area of 2576 m$^2$/g. FIGS. 2a-2b show a type-I isotherm, the pore size distribution, and the morphology of the carbon, respectively.

Figure 3:
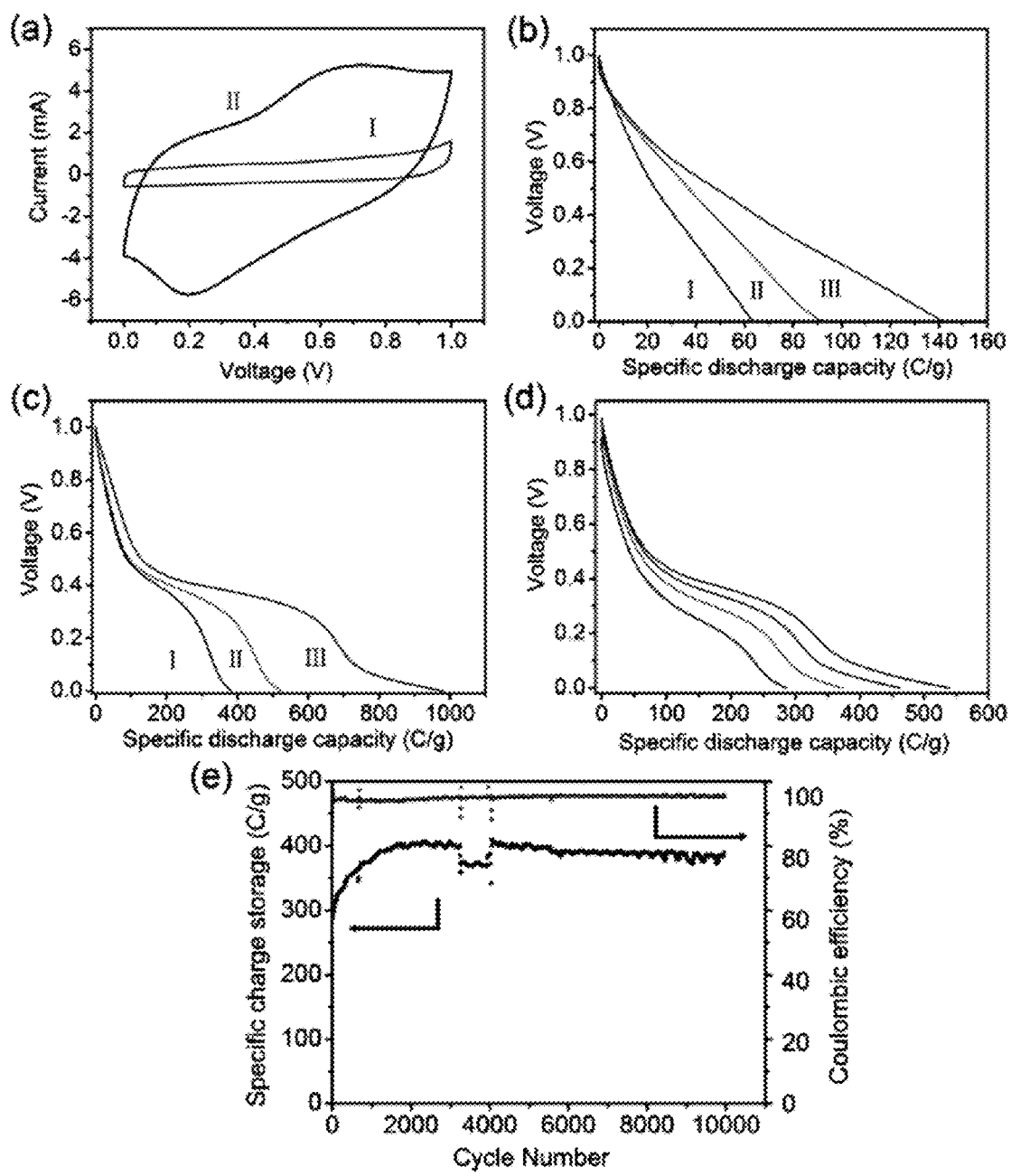
FIGS. 3a-3e show 3a) Cyclic voltammetry (20 mV/s) of cells with different electrolytes, I) $H_2SO_4$ (1 M), II) [KI (0.15 M)+$VOSO_4$ (0.1M)]; 3b) Galvanostatic discharge profiles of cells with different electrolytes I) $H_2SO_4$ (1 M), II) KI (0.15 M), III) $VOSO_4$ (0.1 M) at the current rate of 1 A/g; 3c)

Cyclic voltammetry (CV) and galvanostatic measurements were conducted to compare the performance of the different electrolytes. As shown in FIG. 3a shows, the H$_2$SO$_4$ (1 M) cell exhibits a typical capacitive CV while the [KI (0.15 M)+VOSO$_4$ (0.1 M)] cell exhibits peaks in the CV and a much larger area enclosed in the CV curve, indicating faradaic redox behavior. As shown in FIG. 3b, the voltage of the H$_2$SO$_4$ (1 M) cell is a linear function of the charge stored, characteristic of simple capacitive behavior. The energy density is calculated to be 3.6 W·h/kg, a typical value for EDLC's using aqueous electrolyte. All energy densities were calculated by integration of the discharge curves based on the mass only from both electrodes in this study. The energy densities were improved to 5.2 W·h/kg for the KI (0.15 M) cell and 7.5 W·h/kg for the VOSO$_4$ (0.1 M) cell.

Cells containing either KI or VOSO$_4$ exhibit approximately a linear voltage as a function of the stored charge, similar to hydroquinone-mediated EDLCs. When only one redox-active ion is introduced (either $I^-$ or $VO^{2+}$), the cell discharge profile roughly reflects the capacitive process of the other electrode. As FIG. 3c shows, discharge curves of [KI+VOSO$_4$] cells reveal the distinct redox plateaus. For the [KI (0.75 M)+VOSO$_4$ (0.5 M)] cell, the energy density reaches 42 W·h/kg. The charge storage and energy density of [KI+VOSO$_4$] cells increase when the concentrations of the active species are higher but are not proportional to the concentration. Note that the [KI (3 M)+VOSO$_4$ (2 M)] cell cannot be polarized to a cell voltage of 1.0 V (FIG. 4) at a current of 1 A/g, consistent with the hypothesis that the large concentrations of redox electrolyte cannot all be accommodated in the double layer of the charged cell and therefore allows self-discharge. Due to the poor cycling stability of the [KI (0.75 M), VOSO$_4$ (0.5 M)] cell, the rate performance of [KI (0.3 M)+VOSO$_4$ (0.2 M)] cell was further investigated. The charge storage capacity was well maintained when rates are doubled and quadrupled (FIG. 3d).

The aforementioned results demonstrate that solvated redox-active ions significantly improve the energy density of EDLCs. Note that the sum of the capacities of the [KI (0.15 M)] cell and the [VOSO$_4$ (0.1 M)] cell, 236 C/g, is much less than the mixed [KI (0.15 M), VOSO$_4$ (0.1 M)] cell, 384 C/g (TABLE 1). This high capacity can be attributed to new ions formed by reactions between KI and VOSO$_4$, which are discussed below. The galvanostatic cycling (FIG. 3e) of the [KI (0.3 M)+VOSO$_4$ (0.2 M)] cell at a current density of 4 A/g was further tested. Surprisingly, the charge storage capacity slowly increased upon cycling in the first 2000 cycles to 400 C/g. The increase may be caused by the formation of new redox-active ions in the electrolyte. The energy density of this new system is comparable to the pseudocapacitor systems that use symmetric oxides/oxides or hybrid oxides/carbon-based materials. The >10,000 cycles lifetime, with over 95% capacity retention, suggests that the system using solvated redox-active species can maintain the excellent durability of EDLCs. The high coulombic efficiency of 95% indicates that self-discharge is mitigated on the timescale studied. In order to further study the self-discharge, the open circuit voltage (OCV) of the device were recorded and compared it to a commercial aqueous capacitor (Cellergy) that uses a conventional acidic redox-inert electrolyte. Similar discharge curves were recorded over 1 hr with the OCV decreased to 0.76 V and 0.81 V for our system and the commercial cell, respectively (FIG. 5). The results suggest that anionic catholyte and cationic anolyte in the electrolyte do not contribute extensively to self-discharge.

TABLE 1

| Electrolytes | Specific discharge capacitance (C/g) | Specific energy density (Wh/kg) | Round trip efficiency (%) |
| --- | --- | --- | --- |
| H$_2$SO$_4$ | 63 | 3.6 | 54 |
| KI (0.15M) | 94 | 5.2 | 66 |
| VOSO$_4$ (0.1M) | 142 | 7.5 | 45 |
| VOSO$_4$ (0.1M) + KI (0.15M) | 384 | 20 | 66 |
| VOSO$_4$ (0.2M) + KI (0.3M) | 522 | 27 | 58 |
| VOSO$_4$ (0.5M) + KI (0.75M) | 981 | 42 | 56 |

The mechanism for the enhanced charge storage was studied. It is important to confirm whether the charging leads to the formation of new oxidized anions at the positive electrode and new reduced cations at the negative electrode. An H-cell (two half cells separated by a glass frit) filled with an electrolyte of [KI (0.3 M)+VOSO$_4$ (0.2 M)] at 1.0 V was polarized. At this cell voltage, the potential at the positive electrode goes up from the potential of zero charge (PZC) of the porous carbon electrode (0.42 V vs. standard hydrogen electrode (SHE)) to a voltage where I$^-$ is likely oxidized to I$_3^-$. The potential at the negative electrode deviates from the PZC to a voltage where VO$^{2+}$ could be reduced to V$^{3+}$ (or to complex ions that contain V(III)). It was expected that both catholyte and anolyte may contain I$_3^-$ and V$^{3+}$ since the ions diffuse within the H-cell. In UV-Vis spectra of the catholyte, new adsorption peaks of I$_3^-$ at 286 nm and 352 nm are observed, compared to the original electrolyte (FIG. 3a). The absorption of V$^{3+}$ in the UV-Vis spectra has not been observed. This may be due to strong adsorption of VO$^{2+}$ and the overlapping absorption wavelengths for VO$^{2+}$ and V$^{3+}$. More UV-Vis spectra of related solutions are shown in FIGS. 7-11 and TABLE 2. Raman measurements show the peak intensity of VO$^{2+}$ decreases in anolyte, compared to the original electrolyte, suggesting that the VO$^{2+}$ ions were consumed at negative electrode (FIG. 6b).

TABLE 2

| | | | | | | | |
| --- | --- | --- | --- | --- | --- | --- | --- |
| KI aqueous solution (store 1 h) | 194 | 226 | | | | | |
| VOSO$_4$ aqueous solution (store 1 h) | | | 242 | | | 630 | 768 |
| the original electrolyte (store 1 h) | 194 | 226 | 242 | | | 630 | 768 |
| catholyte (charge 1 h) | 194 | 226 | | 286 | 352 | 630 | 768 |
| anolyte (charge 1 h) | 194 | 226 | | 286 | 352 | 630 | 768 |
| ions designed | I$^-$ | I$^-$ | VO$^{2+}$ | I$_3^-$ | I$_3^-$ | VO$^{2+}$ | VO$^{2+}$ |

Mass spectroscopy (MS) analyses was conducted on catholyte, anolyte and the original electrolyte. Interestingly, the primary anion and cation in the original electrolyte are identified as [(VO$^{2+}$)(I$^-$)$_3$]$^-$ and [(VO$^{2+}$)$_2$.4H$_2$O]$^{4+}$, respectively. The mass spectra of anions from catholyte and the original electrolyte are compared in FIG. 12a and FIG. 12b. It is worth noting that a peak at 381 was observed for the original electrolyte. This is attributed to 3I$^-$ since the I$_3^-$ peak was not observed in the UV-Vis spectrum of the original electrolyte. This signal of 3I$^-$ can be due to the fragmentation process of [(VO$^{2+}$)(I$^-$)$_3$]$^-$ during the mass spectroscopy analysis. New peaks at 399 and 624 are identified in the catholyte to be [(I$_3^-$)(H$_2$O)]$^-$ and [(V$^{3+}$)(HSO$_4^-$)(SO$_4^{2-}$)(I$_3^-$)]$^-$, respectively. The peak intensity at 381 was increased as well, corroborating the UV-Vis results. It is evident that I$^-$ ions are oxidized into I$_3^-$ that may or may not reside in the complex ions. The mass spectra of cations from anolyte and the original electrolyte are compared in FIG. 12c and FIG. 12d. New peaks at 348, 539, 591 can be identified as [(V$^{3+}$)$_2$(SO$_4^{2-}$)$_2$.3H$_2$O]$^{2+}$, [(V$^{3+}$)(I$_3^-$).6H$_2$O]$^{2+}$, and [(V$^{3+}$)(O$_2^0$)(I$_3^-$)(I$^-$)]$^+$, respectively. The results show that V(III) was formed during the polarization, and many newly-formed cations contain V(III) (See detailed information in TABLE 2 and FIG. 8). Digital photos of the H-cell before and after charging show that the catholyte color turned from blue to green (FIGS. 7a-7c). The above chemical characterization data suggest that the majority of species in the catholyte are anionic and the majority in the anolyte are cationic, which is important for preventing self-discharge without an ion-selective membrane.

In summary, the current invention demonstrates a new strategy to use anolyte and catholyte in an EDLC configuration to store charge by both Faradaic and capacitive processes simultaneously. The mixed [KI+VOSO$_4$] electrolyte serves as the source for both anolyte and catholyte. Excellent cycling performance was demonstrated in the cell design. The energy storage mechanism of the new system using anolyte and catholyte was investigated by UV-Vis spectra and MS. Incorporating Faradaic energy storage using stable soluble redox species that are appropriately charged to be incorporated into the electric double layer likely enables the long cycling life and improved energy densities. This approach represents a new route for device design that may be widely applicable for improving EDLC energy storage devices.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the concentrations of catholyte and anolyte are in a range from 0.01 M to 5 M. Other soluble additives beside anolyte or catholyte can be added into the electrolyte. In another variation, the solvents of the electrolytes can be water or non-aqueous. Further, the electrodes can be made of but not limited to carbon. The electrodes can be made of various types of carbons, including but not limited to microporous carbon, activated carbon, mesoporous carbon, macroporous carbon, carbon nanotubes, graphenes, fullerene, carbon felt, and porous graphite. The pore size of porous electrodes can range from below 2 nm to above 1000 nm. Additionally, the catholyte and/or anolyte may be contained in a sealed device or constantly flows into the device from storage tanks Further, the device may contain anolyte or catholyte or both of them.

All such variations are considered to be within the scope and spirit of the present invention as defined by the following claims and their legal equivalents.

What is claimed:

1. An electrical double layer capacitor (EDLC) energy storage device, comprising:
   a. an electrolyte comprising an anionic catholyte and a cationic anolyte;
   b. a positively charged electrode; and
   c. a negative charged electrode, wherein negatively charged oxidized species in said anionic catholyte are electrostatically attracted to said positively charged electrode, wherein positively charged reduced species in said cationic anolyte are electrostatically attracted to said negatively charged electrode, wherein self-discharge of said EDLC energy storage device is prevented.

2. The EDLC energy storage device of claim 1, wherein said positively charged electrode comprises a positively charged porous carbon electrode.

3. The EDLC energy storage device of claim 1, wherein i) said negatively charged electrode is polarized, ii) said positively charged electrode is polarized, or iii) said negatively charged electrode is polarized and said positively charged electrode is polarized.

4. The EDLC energy storage device of claim 1, wherein said anionic catholyte and said cationic anolyte comprise redox-reactive solvated ions.

5. The EDLC energy storage device of claim 1, wherein said anionic catholyte is oxidized when said EDLC energy storage device is in a charged condition, wherein said oxidized anionic catholyte remains proximal to said positive electrode.

6. The EDLC energy storage device of claim 1, wherein said cationic anolyte is reduced when said EDLC energy storage device is in a charged condition, wherein said reduced cationic anolyte remains proximal to said negative electrode.

7. The EDLC energy storage device of claim 1, wherein said positive electrode and said negative electrode comprises materials selected from the group consisting of activated carbons, carbon nanotubes, mesoporous carbons, graphenes, metal oxides, and conducting polymers.

8. The EDLC energy storage device of claim 1, wherein said anionic catholyte comprise materials selected from the group consisting of halide ions, metal complex ions, and organic ion redox couples.

9. The EDLC energy storage device of claim 8, wherein said halide ions are selected from the group consisting of $I_3^-$, $I^-$, $Br_3^-$, and $Br^-$.

10. The EDLC energy storage device of claim 8, wherein said metal complex ions comprise material selected from the group consisting of halide atoms, oxygen atoms and hydroxyl groups.

11. The EDLC energy storage device of claim 1, wherein said cationic anolyte comprises material selected from the group consisting of metal ions, metal complex ions, and organic ions.

12. The EDLC energy storage device of claim 11, wherein said metal ions comprise material selected from the group consisting of $Ti^{2+}$, $Ti^{4+}$, $V^{2+}$, $V^{3+}$, $VO^{2+}$, $VO_2^+$, $Cr^{3+}$, $Cr^{2+}$, $Mn^{2+}$, $Fe^{3+}$, $Fe^{2+}$, $Cu^{2+}$, and $Cu^+$.

13. The EDLC energy storage device of claim 11, wherein said complex ions comprise material selected from the group consisting of metal atoms, halide atoms, oxygen atoms and hydroxyl groups.

14. The EDLC energy storage device of claim 1, wherein said electrolyte comprises non redox-active.

15. The EDLC energy storage device of claim 1, wherein said electrolyte comprises an aqueous solution.

16. The EDLC energy storage device of claim 1, wherein said electrolyte comprises a non-aqueous solution, wherein said non-aqueous solution comprises material selected from the group consisting of acetonitrile, and propylene carbonate.

17. The EDLC energy storage device of claim 1, wherein said electrolyte comprises molten salts.

* * * * *